US012761159B2

(12) United States Patent
Insalago et al.

(10) Patent No.: US 12,761,159 B2
(45) Date of Patent: Oct. 13, 2026

(54) AUTOMATED PHOTOGRAPHY AND INSPECTION STATION

(71) Applicant: M & G Jewelers, Inc., Rancho Cucamonga, CA (US)

(72) Inventors: Michael Insalago, Rancho Cucamonga, CA (US); Juan Guevara, Rancho Cucamonga, CA (US)

(73) Assignee: M&G Jewelers, Inc., Rancho Cucamonga, CA (US)

( * ) Notice: Subject to any disclaimer, the term of this patent is extended or adjusted under 35 U.S.C. 154(b) by 473 days.

(21) Appl. No.: 18/124,636

(22) Filed: Mar. 22, 2023

(65) Prior Publication Data

US 2024/0319107 A1 Sep. 26, 2024

(51) Int. Cl.
*G01N 21/88* (2006.01)
*G01N 21/41* (2006.01)
(Continued)

(52) U.S. Cl.
CPC ..... *G01N 21/8851* (2013.01); *G01N 21/4133* (2013.01); *G01N 21/55* (2013.01);
(Continued)

(58) Field of Classification Search
CPC ........... G01N 21/8851; G01N 21/4133; G01N 21/55; G01N 21/87; G01N 35/00584;
(Continued)

(56) References Cited

U.S. PATENT DOCUMENTS 6,239,867 B1 * 5/2001 Aggarwal .............. G01N 21/87 356/30
6,343,184 B1 1/2002 Huebner
(Continued)

FOREIGN PATENT DOCUMENTS

| | | | |
|---|---|---|---|
| CN | 102830574 | A | 12/2012 |
| CN | 109799214 | A | 5/2019 |
| CN | 110267027 | A | 9/2019 |
| DE | 102016105037 | A1 | 5/2017 |

(Continued)

OTHER PUBLICATIONS

Measurement of Rough Gemstones (Year: 2020).*
(Continued)

*Primary Examiner* — Twyler L Haskins
*Assistant Examiner* — Surafel Yilmakassaye
(74) *Attorney, Agent, or Firm* — Harper & Bates LLP; Shannon W. Bates

(57) ABSTRACT

An automated station includes a plurality of panels forming an enclosure, a camera positioned within the enclosure, a light fixture positioned within the enclosure, a turntable positioned within the enclosure, an inspection device, and a computer controller functionally coupled to the camera, the light fixture, the turntable, and the inspection device. The computer controller controls the operation of the camera, the light fixture, the turntable, and the inspection device based on information received by the computer controller about an object to be photographed and inspected by the station.

A method includes receiving an object into an automated station and a computer controller functionally coupled to the automated station performing the steps of: receiving information about the object, automatically adjusting one or more configuration options of the automated station based on the received information, and receiving input about whether the automated station will photograph the object, inspect the object, or both.

18 Claims, 8 Drawing Sheets

(51) Int. Cl.

| | |
|---|---|
| ***G01N 21/55*** | (2014.01) |
| ***G01N 21/87*** | (2006.01) |
| ***G01N 35/00*** | (2006.01) |
| *G01N 21/17* | (2006.01) |

(52) U.S. Cl.
CPC ....... *G01N 21/87* (2013.01); *G01N 35/00584* (2013.01); *G01N 2021/177* (2013.01); *G01N 2201/025* (2013.01)

(58) Field of Classification Search
CPC ....... G01N 2021/177; G01N 2201/025; G01N 2201/1296
See application file for complete search history.

(56) References Cited

U.S. PATENT DOCUMENTS

| | | | |
|---|---|---|---|
| 6,969,033 | B2 | 11/2005 | van der Linden |
| 10,260,672 | B2 | 4/2019 | Martini |
| 11,128,797 | B2 | 9/2021 | Chen et al. |
| 2007/0035539 | A1 | 2/2007 | Matsumura et al. |
| 2020/0374431 | A1 | 11/2020 | Sugii et al. |

FOREIGN PATENT DOCUMENTS

| | | | | | |
|---|---|---|---|---|---|
| WO | 2004100561 | A1 | | 11/2004 | |
| WO | WO-2019185993 | A1 | * | 10/2019 | ........... H04N 23/676 |
| WO | WO-2020254059 | A1 | * | 12/2020 | ............. G01N 21/87 |

OTHER PUBLICATIONS

English Translation of CN 102830574 A, obtained from TotalPatent One on Oct. 6, 2021, 20 pages.
English Translation of CN 109799214 A, obtained from TotalPatent One on Oct. 6, 2021, 19 pages.
English Translation of CN 110267027 A, obtained from TotalPatent One on Oct. 6, 2021, 22 pages.
English Translation of DE 110267027 A1, obtained from TotalPatent One on Oct. 6, 2021, 30 pages.

* cited by examiner

AUTOMATED PHOTOGRAPHY AND INSPECTION STATION

TECHNICAL FIELD

The present disclosure relates to an automated photography station, and more particularly, to an automated photography and inspection station operable to properly visualize different types of objects, and operable to determine characteristics of an object. The present disclosure also relates to methods of photographing and/or inspecting an object.

BACKGROUND

Photography systems and methods have traditionally used multiple, manually operated cameras to take individual photographs of stationary objects. To photograph these stationary objects from different vantage points, the stationary objects and/or the cameras are manually rotated, and multiple photographs are taken at each stationary position to completely visualize the object. Due to the manual nature of these traditional systems and methods, photographic blind spots can occur, and similar objects are not visualized in a consistent manner due to manually controlled camera inconsistencies and rotation inconsistencies. In addition, traditional photography systems and methods did not offer configuration options to enable proper visualization of different types of objects.

SUMMARY

The present disclosure is directed to an automated photography and inspection station and methods of operation.

In an implementation, the automated station is computer controlled and fully configurable to enable proper photographic visualization of different types of objects, such as jewelry, clothing, and industrial equipment, for example.

In an implementation, the automated station is operable to inspect and determine characteristics of an object. In some implementations, the automated station is operable to measure dimensions of an object to determine its nominal size, length, width, height, diameter, and thickness, for example. In some implementations, the automated station is operable to take light-related measurements to determine characteristics of a gemstone. In some implementations, the determined characteristics of the gemstone include the gemstone type and whether the gemstone is real or synthetic.

In another implementation, the present disclosure is directed to an automated method of photographing objects. The method may comprise receiving an object into a computer-controlled automated station, receiving information about the object, automatically adjusting one or more configuration options of the automated station based on the information about the object, and taking one or more photographs of the object. In some implementations, the one or more configuration options include adjustable lighting features, adjustable camera features, and adjustable turntable features.

In yet another implementation, the present disclosure is directed to an automated method of inspecting objects. The method may comprise receiving an object into a computer-controlled automated station, receiving information about the object, automatically adjusting one or more configuration options of the automated status based on the information about the object, and inspecting the object. In some implementations, the method further comprises positioning an object onto a tray with known dimensions and receiving the object on the tray into the computer-controlled automated station. In some implementations, the method further comprises taking one or more photographs of the object on the tray, and using the photographs to determine measurements of the object by comparison with the known dimensions of the tray. In some implementations, the known dimensions of the tray include a length, a width, and a height of the tray. In some implementations, the known dimensions of the tray include one or more circles of a specific diameter printed on a base surface of the tray.

Another automated method of inspecting objects may comprise positioning a gemstone within a computer-controlled automated station, using a camera to measure a reflectivity of light coming off the gemstone, using a refractometer to measure a refractive index of light coming off the gemstone, and determining characteristics of the gemstone type based on the measurements. In some implementations, the determined characteristics of the gemstone include the gemstone type and whether the gemstone is real or synthetic.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which.

Like reference symbols in the various drawings indicate like elements.

DETAILED DESCRIPTION

The present disclosure is directed to an automated photography and inspection station and methods of operation. In an implementation, the automated station is computer controlled and fully configurable to enable proper photographic visualization of different types of objects. In an implementation, the automated station is further operable to inspect and determine characteristics of an object.

To fully visualize an object, the automated station may include multiple, independently configurable cameras, multiple independently configurable light fixtures, and a turntable that may remain stationary or may rotate based on configurable parameters. Thus, the automated station allows for computer control of cameras, light fixtures, and a turntable during operation. The automated station also provides rapid object visualization by leveraging multiple cameras documenting the same viewing area, and it produces consistent visualization of like objects. Photographic images taken by the automated station may be stored locally and may be made available immediately after capture.

The automated station may further be operable to inspect and determine characteristics of an object. In some implementations, the automated station is operable to measure dimensions of an object to determine its nominal size, length, width, height, diameter, and thickness, for example. The automated station may include additional sensors and measurement devices, such as scales to measure the weight of an object, or a refractometer to measure a refractive index of light from an object. The automated station may further be operable to take light-related measurements to determine characteristics of a gemstone. In some implementations, the determined characteristics of the gemstone include the gemstone type and whether the gemstone is real or synthetic.

The automated station may be accessed and controlled through a data processing system that enables a user to interact with the automated station via direct interaction with the hardware, via a custom software solution, through onboard firmware commands, and/or through an onboard API. For example, each automated station camera and light fixture configuration can be set manually, through direct interaction with the custom software, through a configuration file in the onboard firmware, or through parameters passed via the API.

The automated station software may provide automatic image cropping to maximize visualization of a region of interest of the photographed object. The automated station software may further allow for full configuration of the number of images taken, image selection and resolution, and physical operation controls. The automated station software may allow for full control of the speed of object rotation on the turntable.

Figure 1:
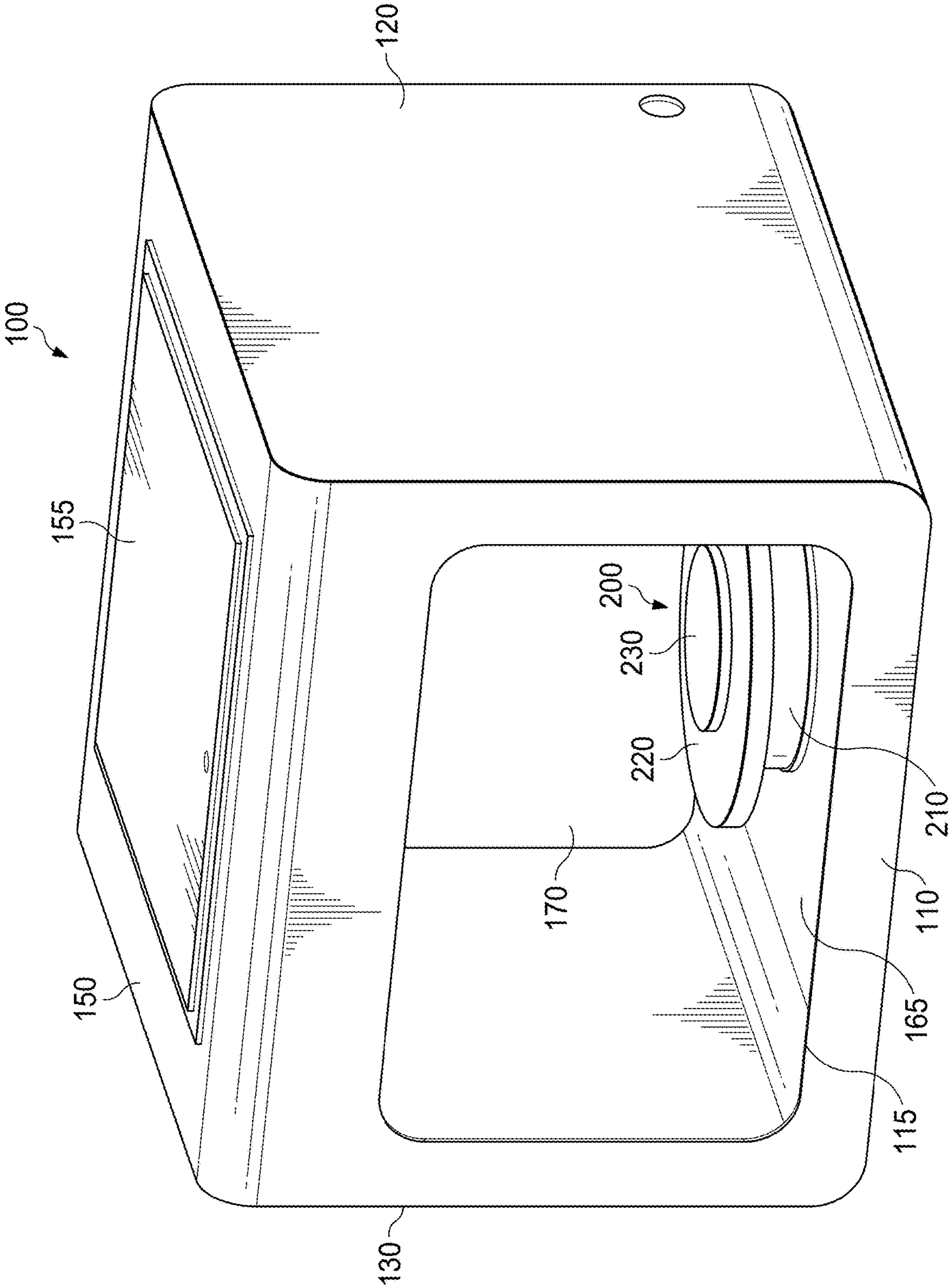
FIG. 1 illustrates a front perspective view of an implementation of an automated photography and inspection station according to the present disclosure.
Figure 2:
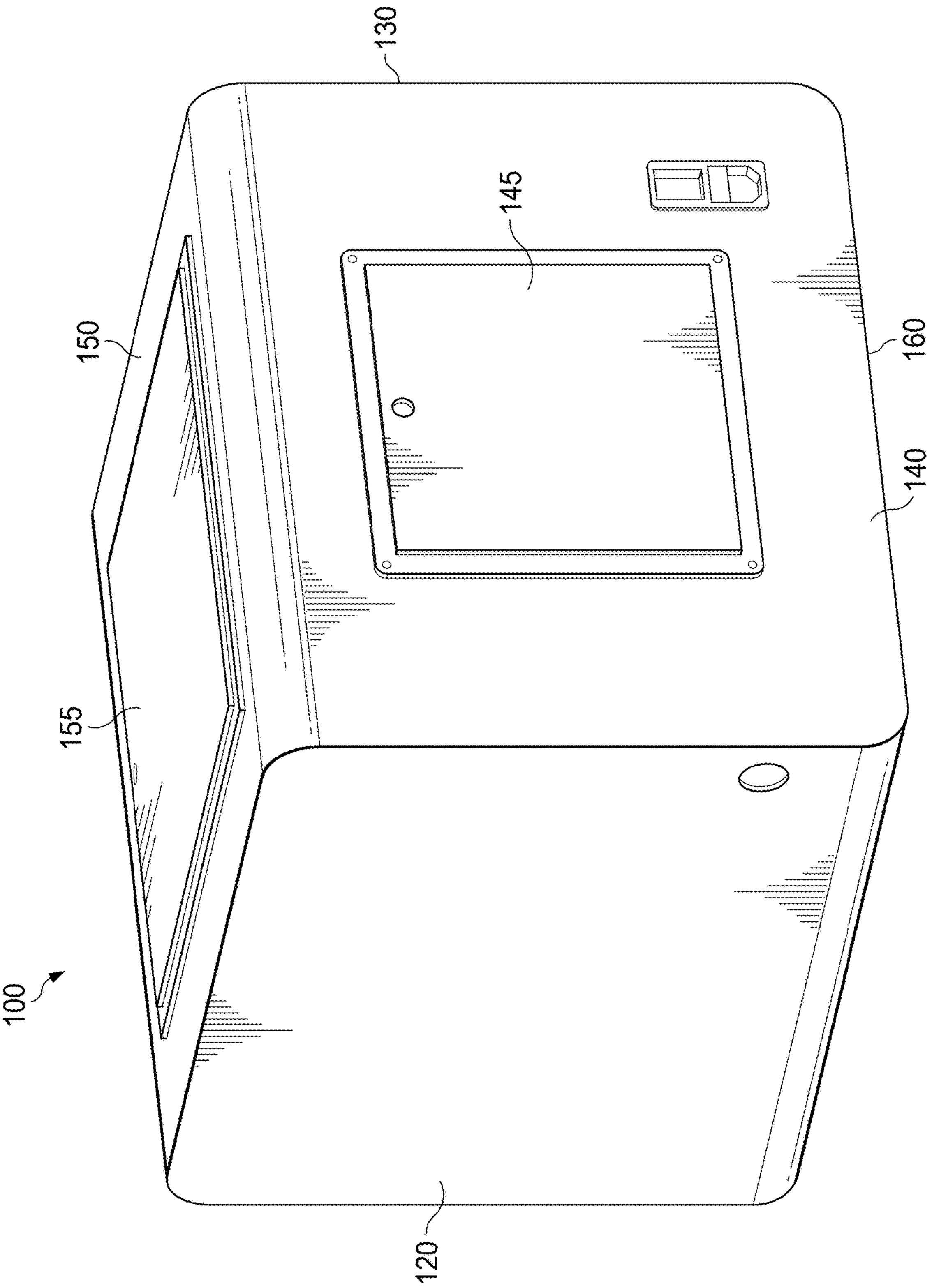
FIG. 2 illustrates a back perspective view of the automated photography and inspection station of FIG. 1, according to the present disclosure.

Referring now to the drawings, where like reference numerals represent like components, FIG. 1 and FIG. 2 illustrate front and back perspective views, respectively, of an implementation of an automated photography and inspection station 100 according to the present disclosure. The automated station 100 comprises a front panel 110, a first side panel 120, a second side panel 130, a back panel 140, a top panel 150, and a bottom panel 160 coupled together, such as by welding. In some implementations, the automated station 100 is formed of metal, and the panels 110, 120, 130, 140, 150 and 160 are formed from laser cut and bent sheet metal components, but many other constructions are possible.

The front panel 110 includes an opening 115 to provide a user access to the interior of the automated station 100 where an implementation of a turntable 200 is shown positioned on an interior floor 165 of the automated station 100. The turntable 200 may include a base 210, a large platform 220, and a raised, smaller platform 230 that forms a stacked configuration. In some implementations, at least one of the platforms 220, 230 is motorized and operable to rotate at a configurable rotation speed. Thus, during operation of the automated station 100, the platforms 220, 230 of the turntable 200 may be stationary or rotating at a user's election, and the automated station 100 enables automated rotation based on configurable parameters.

Figure 3:
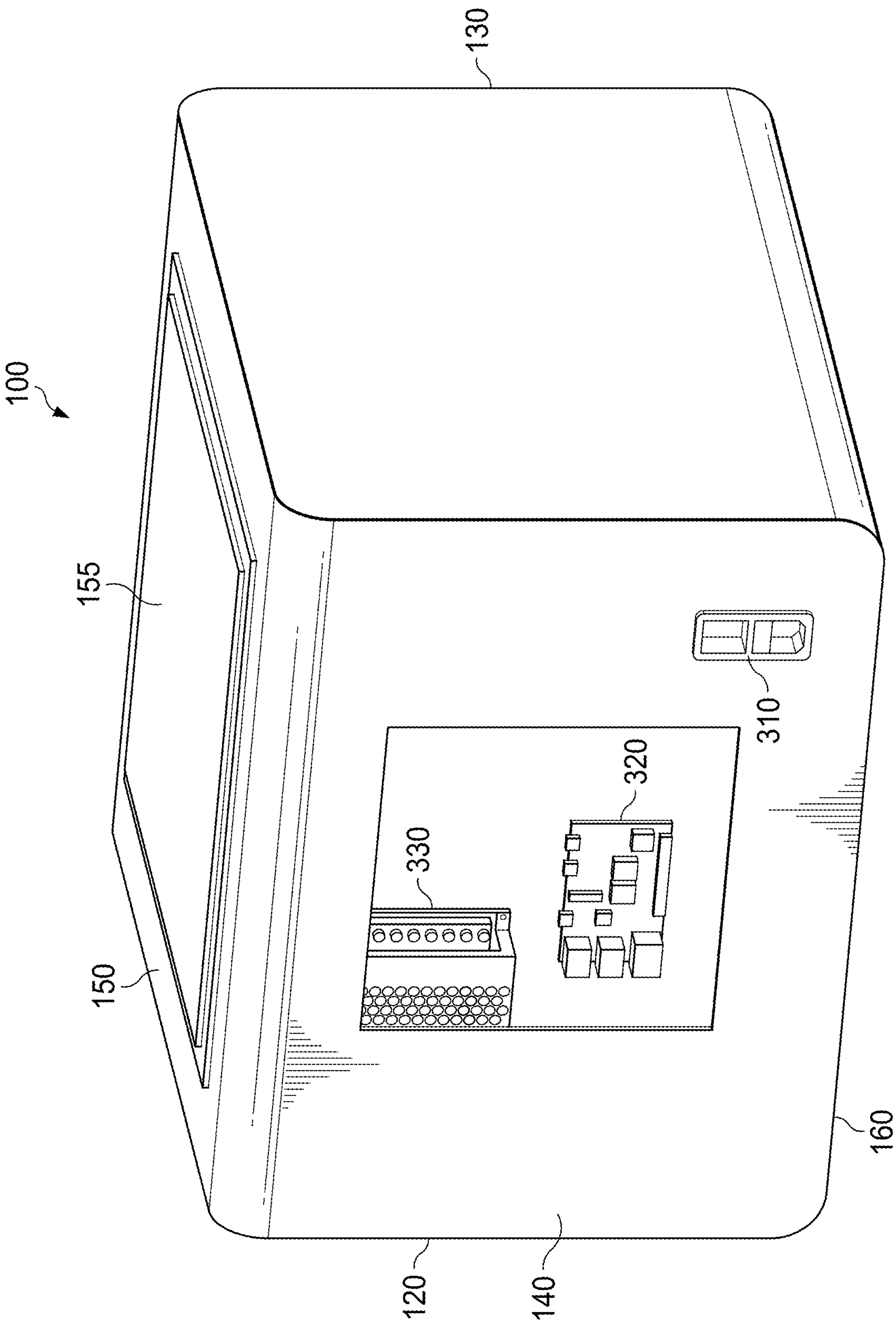
FIG. 3 illustrates another back perspective view of the automated photography and inspection station of FIG. 1 with an access cover removed to provide access to electrical components, according to the present disclosure.

Referring now to FIG. 2 and FIG. 3, both of which illustrate back perspective views of the automated photography and inspection station 100 according to the present disclosure. In some implementations, the automated station 100 includes panel mount connectors 310 that enable easy connection to a computer controller for the automated station 100. The panel mount connectors 310 may include a power plug with a replaceable fuse and a single power switch. In some implementations, the panel mount connectors 310 provide internal access to USB and HDMI ports and external access to Ethernet.

In some implementations, the back panel 140 includes an access cover 145, which is shown in FIG. 2 but has been removed in FIG. 3. The removable back access cover 145 allows access to electrical components 320, 330 housed in a back portion of the automated station 100. In some implementations, the top panel 150 similarly includes an access cover 155 that can be removed for access to the interior of the automated station 100. The removable top access cover 155 allows access for lighting adjustments, camera adjustments, component replacement, and for other purposes.

Figure 4:
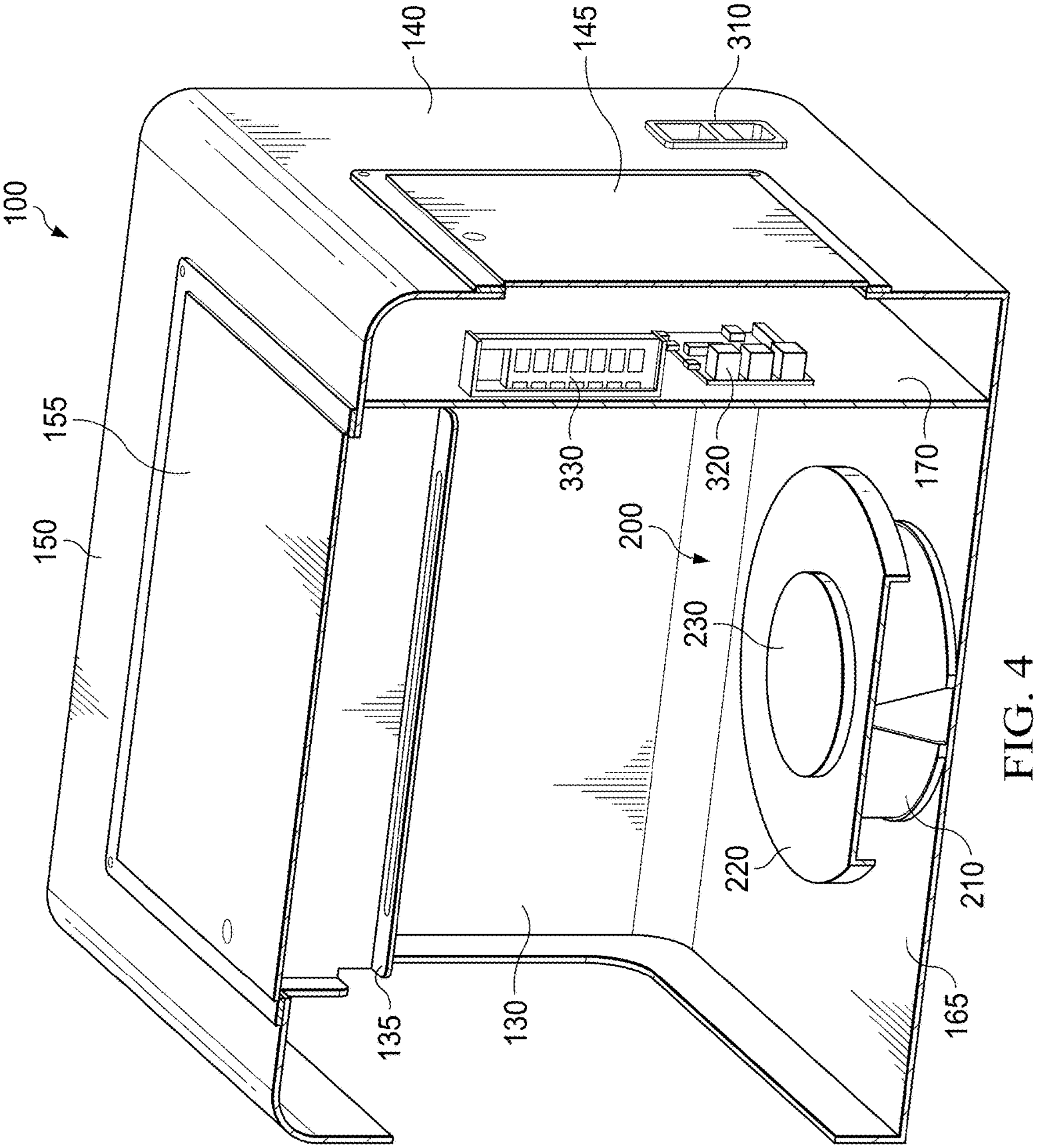
FIG. 4 illustrates a side cut-away view of the automated photography and inspection station of FIG. 1 showing a false back wall that hides electrical components on the back of the automated station, according to the present disclosure.

Referring now to FIG. 1 and FIG. 4, which illustrates a side cut-away view of the automated station 100, in some implementations, a false back wall 170 may be provided to hide and protect the electrical components 320, 330 housed in the back portion of the automated station 100, according to the present disclosure.

Figure 5:
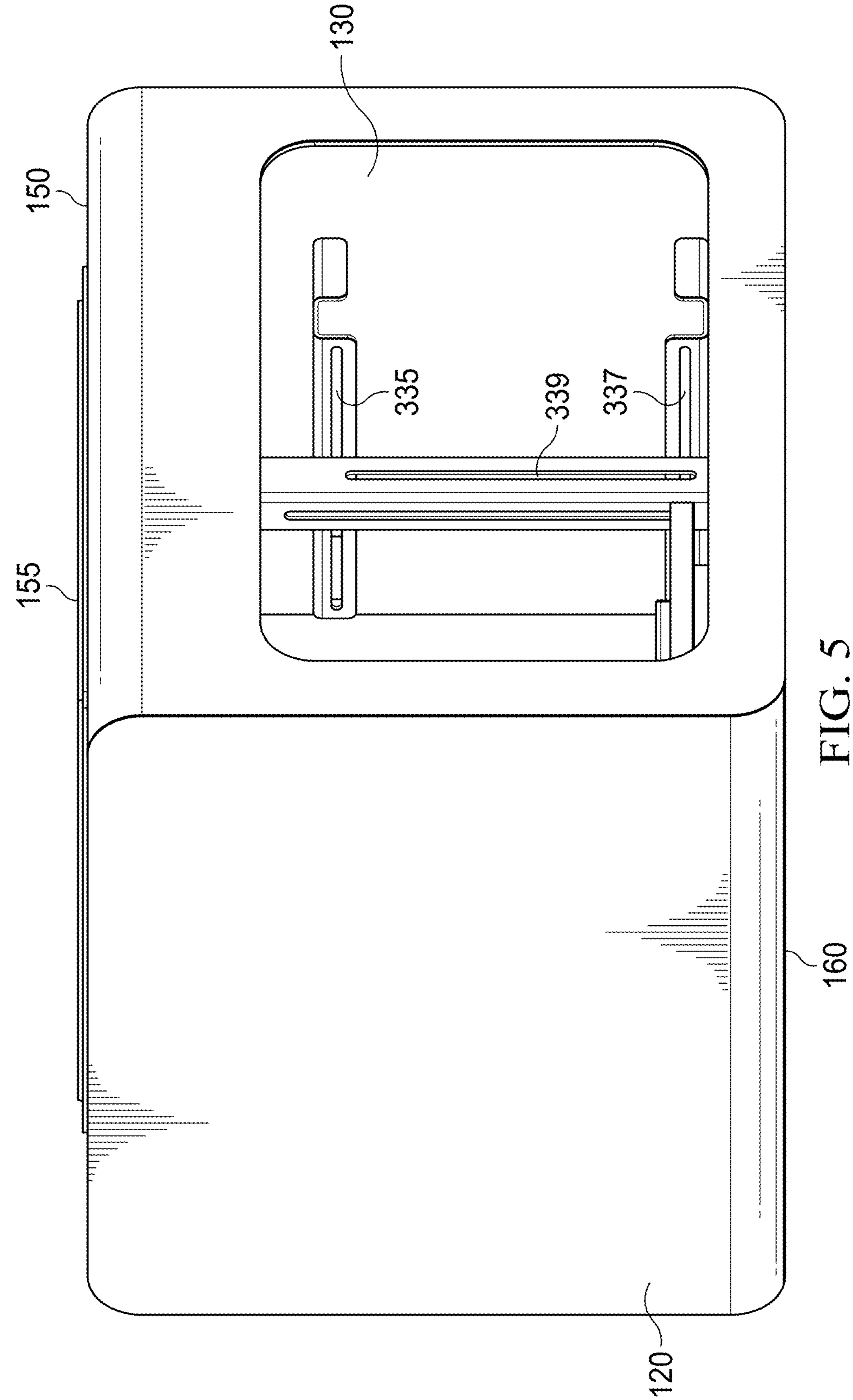
FIG. 5 illustrates another front perspective view of the automated photography and inspection station of FIG. 1 showing a side light fixture, according to the present disclosure.

Referring now to FIG. 1 and FIG. 5, which illustrates another front perspective view of the automated station 100, a plurality of brackets 335, 337 may be coupled to one or both of the first side panel 120 and the second side panel 130 to function as adjustable camera mounts and to support other components, such as a side light fixture 339. In some implementations, the side light fixture 339 may be slid in through the opening 115 in the front panel 110 in the direction of the arrows. This positioning enables access to cameras for camera adjustments and light fixtures for lighting adjustments.

In some implementations, the automated station 100 of the present disclosure comprises a fixed camera mounted to the top panel 150 and a plurality of cameras supported by adjustable camera mounts on the side panels 120, 130 and/or the back panel 140 of the automated station 100. In some implementations, one camera is positioned on each of the side panels 120, 130 and on the back panel 140. The automated station 100 may further include multiple, independently configurable light fixtures. This allows for simultaneous and/or sequential photographs to be taken of an object that is positioned within the viewing area, such as on the turntable 200.

Figure 6:
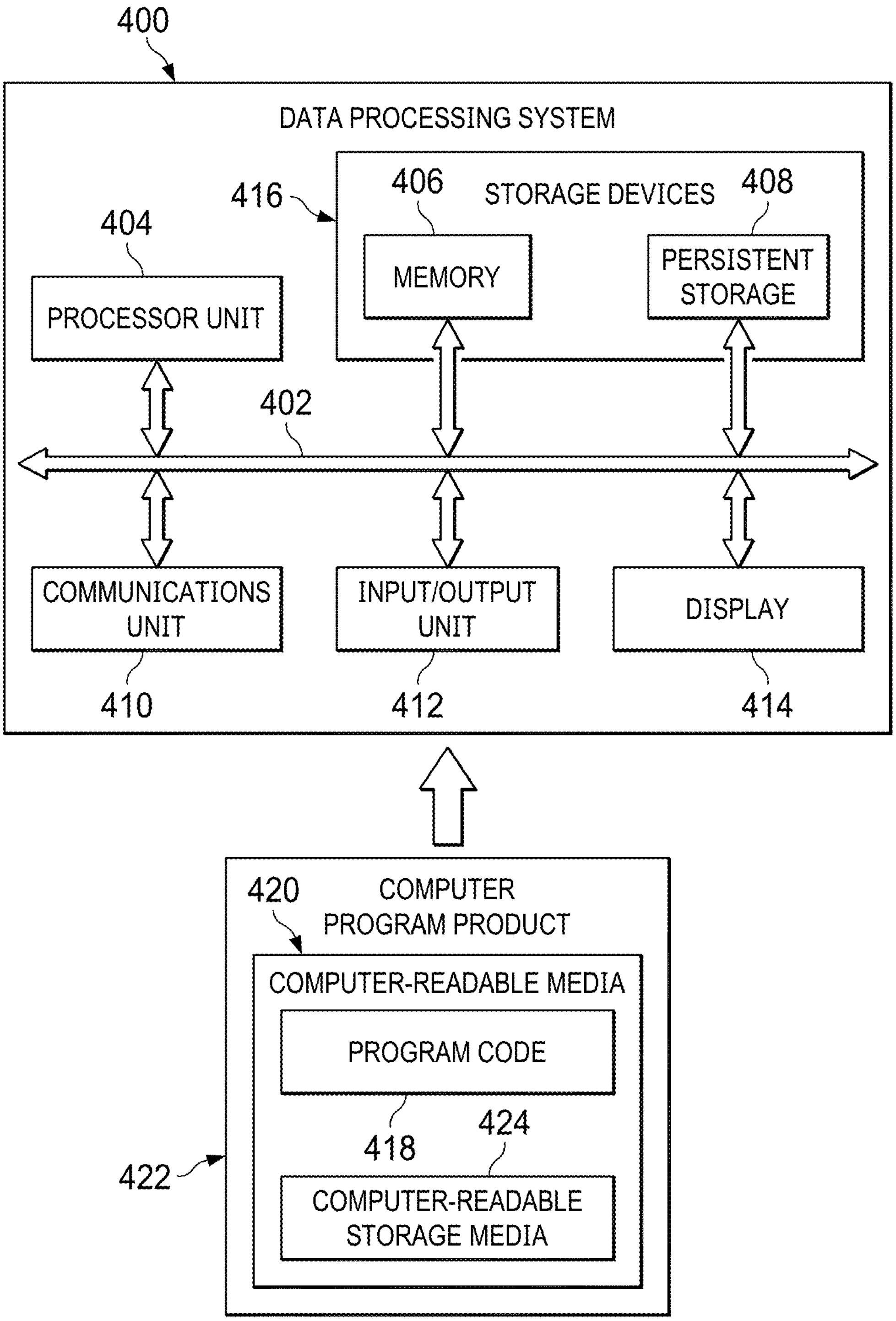
FIG. 6 depicts a block diagram of an implementation of a data processing system, according to the present disclosure.

With reference now to FIG. 6, a block diagram of a data processing system 400 is depicted in accordance with a representative example, whether physically localized or in the cloud. Data processing system 400 can be used to implement the computer controller for the automated station 100. In this illustrative example, data processing system 400 includes communications framework 402, which provides communications between processor unit 404, memory 406, persistent storage 408, communications unit 410, input/output (I/O) unit 412, and display 414. In this example, communications framework 402 takes the form of a bus system.

Processor unit 404 serves to execute instructions for software that can be loaded into memory 406. Processor unit 404 includes one or more processors. For example, processor unit 404 can be selected from at least one of a multicore processor, a central processing unit (CPU), a graphics processing unit (GPU), a physics processing unit (PPU), a digital signal processor (DSP), a network processor, or some other suitable type of processor. For example, processor unit 404 may be implemented using one or more heterogeneous processor systems in which a main processor is present with secondary processors on a single chip. As another illustrative example, processor unit 404 can be a symmetric multi-processor system containing multiple processors of the same type on a single chip.

Memory 406 and persistent storage 408 are examples of storage devices 416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 416 may also be referred to as computer-readable storage devices in these illustrative examples. Memory 406 in these examples can be, for example, a random-access memory or any other suitable volatile or non-volatile storage device.

Persistent storage 408 may take various forms, depending on particular implementations. For example, persistent storage 408 may contain one or more components or devices. For example, persistent storage 408 can be a hard drive, a solid-state drive (SSD), a flash memory, a rewritable optical disk, a rewritable magnetic tape, or some combination thereof. The media used by persistent storage 408 also can be removable. For example, a removable hard drive can be used for persistent storage 408.

Communications unit 410, in these illustrative examples, provides for communications with other data processing systems or devices. In these illustrative examples, communications unit 410 is a network interface card.

Input/output unit 412 allows for input and output of data with other devices that can be connected to data processing system 400. For example, input/output unit 412 may provide a connection for user input through at least one of a keyboard, a mouse, or some other suitable input device. Display 414 provides a mechanism to display information to a user.

Instructions for at least one of the operating systems, applications, or programs can be located in storage devices 416, which are in communication with processor unit 404 through communications framework 402. The processes of different examples can be performed by processor unit 404 using computer-implemented instructions, which may be located in a memory, such as memory 406.

These instructions are referred to as program code, computer usable program code, or computer-readable program code that can be read and executed by a processor in processor unit 404. The program code in the different examples can be embodied on different physical or computer-readable storage media, such as memory 406 or persistent storage 408.

Program code 418 is located in a functional form on computer-readable media 420 that is selectively removable and can be loaded onto or transferred to data processing system 400 for execution by processor unit 404. Program code 418 and computer-readable media 420 form computer program product 422 in these illustrative examples. In the illustrative example, computer-readable media 420 is computer-readable storage media 424.

In these illustrative examples, computer-readable storage media 424 is a physical or tangible storage device used to store program code 418 rather than a medium that propagates or transmits program code 418.

Computer-readable signal media 426 may be, for example, a propagated data signal containing program code 418. For example, computer-readable signal media 426 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

Further, as used herein, “computer-readable media” can be singular or plural. For example, program code 418 can be located in computer-readable media 420 in the form of a single storage device or system. In another example, program code 418 can be located in computer-readable media 420 that is distributed in multiple data processing systems. In other words, some instructions in program code 418 can be located in one data processing system while other instructions in program code 418 can be located in another data processing system. For example, a portion of program code 418 can be located in computer-readable media 420 in a server computer, while another portion of program code 418 can be located in computer-readable media 420 located in a set of client computers.

Figure 7:
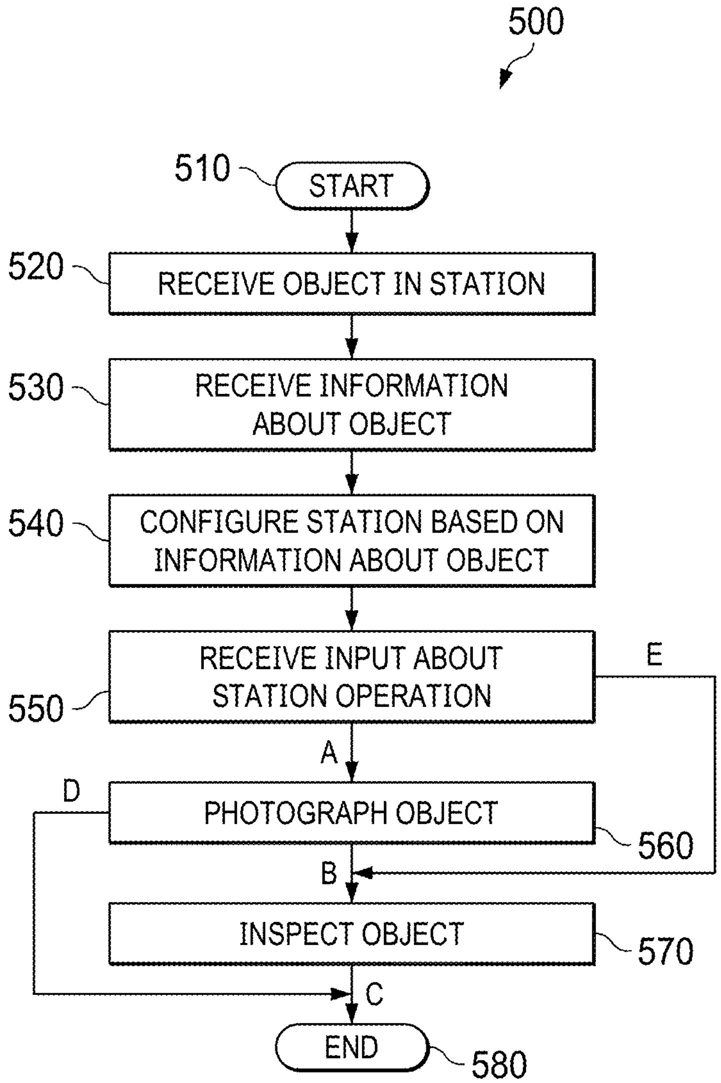
FIG. 7 depicts a flow chart of an implementation of a method for photographing and/or inspecting an object, according to the present disclosure.

In an implementation, the present disclosure is further directed to an automated method of photographing and/or inspecting objects. Referring now to FIG. 7, the method 500 may comprise starting at Step 510, receiving an object into a computer-controlled automated station at Step 520, receiving information about the object at Step 530, automatically adjusting one or more configuration options of the automated station based on the information about the object at Step 540, and receiving input about the operations to be performed by the computer-controlled automated station at Step 550, such as whether the automated station will be used to photograph the object, inspect the object, or both.

If the input received at Step 550 indicates the automated station will perform both the photography and inspection operations, the method will proceed along path A where one or more photographs of the object will be taken at Step 560, and the method will proceed along path B where the object will be inspected at Step 570, before proceeding along path C to end the method at Step 580.

If the input received at Step 550 indicates the automated station will only perform the photography operation, the method will proceed along path A where one or more photographs of the object will be taken at Step 560, before proceeding along path C to end the method at Step 580.

If the input received at Step 550 indicates the automated station will only perform the inspection operation, the method will proceed along path E to inspect the object at Step 570, before proceeding along path C to end the method at Step 580.

In some implementations of the method 500, receiving information about the object at Step 530 may include receiving information about the type of object. For example, if the automated station is configured to photograph and inspect jewelry, a user may provide information at Step 530 that the object is a ring, a necklace, a bracelet, a watch, or a loose gemstone.

In some implementations of the method 500, the configuration options of the automated station adjusted at Step 540 may include adjustable lighting features, adjustable camera features, and adjustable turntable features. In some implementations, the adjustable lighting features may include the number and location of the light fixtures to be illuminated, the brightness of the illumination of each light fixture, and the angular orientation of each light fixture. In some implementations, the adjustable camera features may include the number and location of the cameras that will capture images of the object, the focus of each cameras, the number of images captured by each camera, and the angular orientation of each camera. In some implementations, the adjustable turntable features may include whether the turntable platform is stationary or rotating, and the speed of turntable platform rotation.

Figure 8:
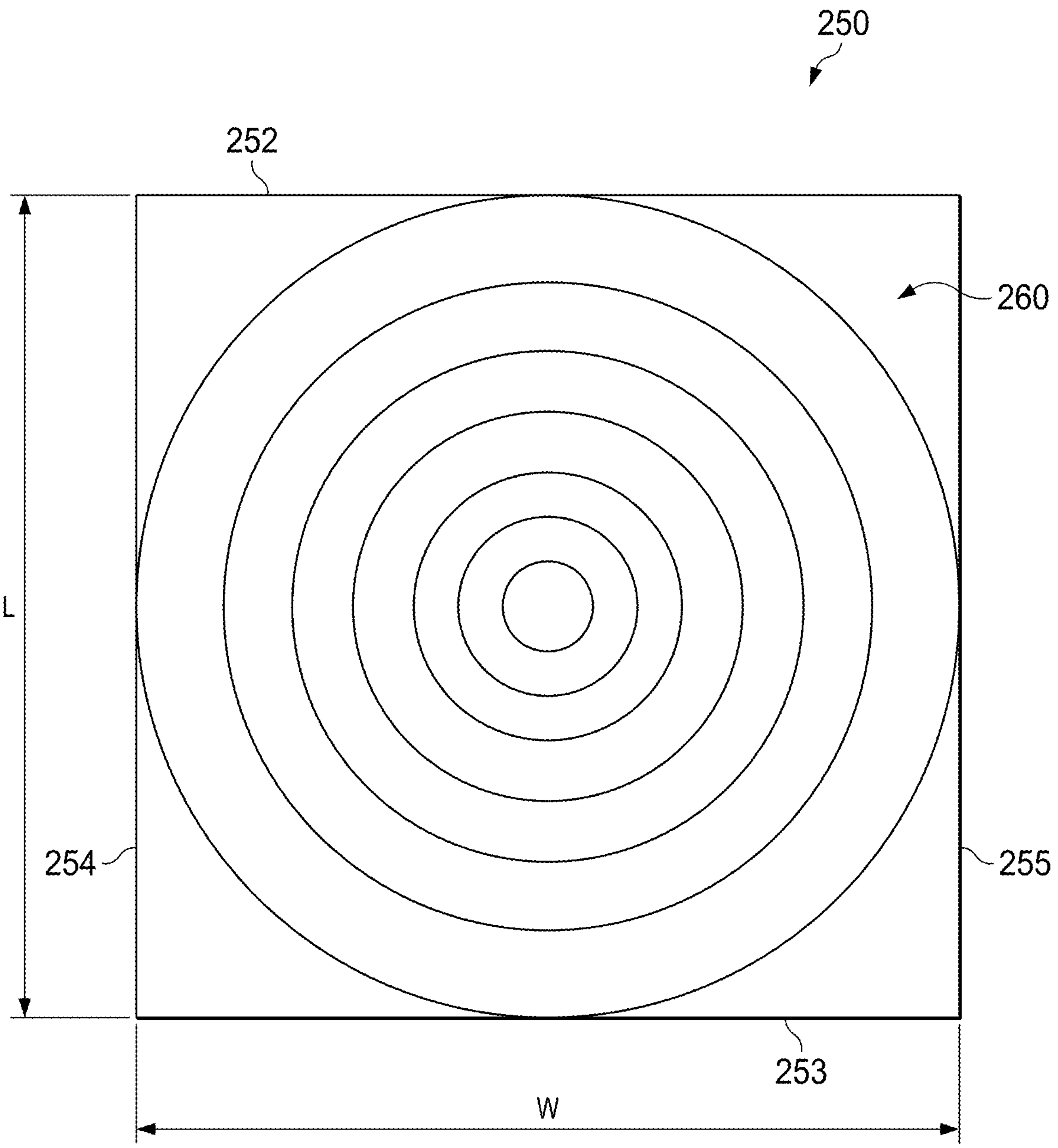
FIG. 8 illustrates a top plan view of an implementation of a tray with a concentric circular pattern, according to the present disclosure.

In some implementations, the method 500 may further comprise positioning an object onto a tray with known dimensions and receiving the object on the tray into the computer-controlled automated station at Step 520. FIG. 8 illustrates a top plan view of an implementation of a generally rectangular tray 250 having opposing sides 252, 253 of a known dimension corresponding to a length L of the tray 250 and opposing sides 254, 255 of a known dimension corresponding to a width W of the tray 250. The tray 250 may further include a surface pattern 260 of concentric circles, each with a known diameter.

In some implementations, a method of inspecting an object further comprises taking one or more photographs of the object on the tray 250, and using the photographs to determine measurements of the object by comparison with known dimensions of the tray.

For example, if the automated station is configured to photograph and inspect jewelry, a user may provide information at Step 530 that the object is a ring, and the method of inspecting the ring may include determining one or more of the nominal ring size, the wall thickness of the ring, and the height of the ring. To do so, a diameter of the ring opening may be compared to the surface pattern 260 of concentric circles, each with a known diameter. In some implementations, the innermost circle of the surface pattern 260 corresponds with a size 7 nominal ring size. In addition, a wall thickness of the ring can similarly be determined using an outer diameter of the ring. Further, a height of the ring can be determined based on how much of the camera frame is filled up by the ring.

As another example, a user may provide information at Step 530 that the object is a bracelet or a necklace in the form of a chain, and the method of inspecting may include determining a length of the chain. To do so, the chain may be formed into a circle such that a diameter of the chain circle may be compared to the surface pattern 260 of concentric circles, each with a known diameter. Alternatively, the chain may be criss-crossed over the surface of the tray 250, and the lengths of each span of chain may be added up to determine a total length. Typically, bracelets are sold in nominal lengths such as 7-inch and 8-inch lengths, and necklaces are sold in nominal lengths such as 16-inch, 18-inch, 20-inch, 24-inch and 30-inch lengths.

In some implementations, a method of inspecting an object may comprise positioning a gemstone within a computer-controlled automated station, using one or more cameras within the automated station to measure a reflectivity of light coming off the gemstone, using a refractometer to measure a refractive index of light coming off the gemstone, comparing the measured refractive index to a database of known refractive indices for gemstones, and determining characteristics of the gemstone type based on the measured reflectivity and refractive index. In some implementations, the determined characteristics of the gemstone include the gemstone type and whether the gemstone is real or synthetic. In some implementations, the determined characteristics are verified to the computer controller for machine learning purposes. The method of inspecting a gemstone may be very sensitive such that the automated station can detect different types of gemstones of the same color.

The automated photography and inspection station and methods of operation of the present disclosure provide a more efficient and more accurate way to photograph and inspect an object as compared to a manual process. In an implementation, a piece of jewelry can be photographed, sized, measured, and a gemstone type can be determined in less than 60 seconds. The automated photography and inspection station and methods of operation enable jewelers and other repair service providers to photographically capture an object accurately upon intake as well as after repairs have been made to verify that repairs have been done properly.

It is to be understood the implementations are not limited to particular systems or processes described which may, of course, vary. For example, the automated station 100 and the tray 250 depicted and described herein may vary in construction and size. In addition, while operational methods are described herein in connection with jewelry, the teachings of the present disclosure may be applied to any object.

It is also to be understood that the terminology used herein is for the purpose of describing particular implementations only, and is not intended to be limiting. As used in this specification, the singular forms "a", "an" and "the" include plural referents unless the content clearly indicates otherwise. As another example, "coupling" includes direct and/or indirect coupling of members.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. An automated photography and inspection station comprising:

- a plurality of panels forming an enclosure;
- a camera positioned within the enclosure;
- a light fixture positioned within the enclosure;
- a turntable positioned within the enclosure;
- an inspection device positioned within the enclosure, the inspection device comprising at least one of: scales operable to measure weight and a refractometer operable to measure a refractive index of light;
- a removeable tray with known dimensional features that enables a determination of one or more dimensional measurements of the object when the object is placed in the enclosure; and
- a computer controller functionally coupled to the camera, the light fixture, the turntable, and the inspection device;

wherein the computer controller controls the operation of the camera, the light fixture, the turntable, and the inspection device based on information received by the computer controller about an object to be photographed and inspected by the station.

2. The station of claim 1, wherein:
the camera is configurable;
the light fixture is configurable;
the turntable is configurable; and
wherein the computer controller configures the camera, the light fixture, and the turntable based on the information received by the computer controller about the object to be photographed and inspected by the station.

3. The station of claim 1, wherein:
at least one of the plurality of panels includes a removable access cover.

4. The station of claim 1, further comprising:
a false wall within the enclosure to hide and protect electrical components disposed between the false wall and one of the plurality of panels.

5. The station of claim 2, wherein:
the camera is mounted on a top panel of the station.

6. The station of claim 5, further comprising:
a plurality of additional configurable cameras, each additional camera positioned on a side panel of the station;
wherein the computer controller is functionally coupled to the plurality of additional configurable cameras;
wherein the computer controller configures and controls the operation of the plurality of additional configurable cameras based on the information received by the computer controller about the object to be photographed and inspected by the station.

7. The station of claim 6, further comprising:
a plurality of additional configurable light fixtures;
wherein the computer controller is functionally coupled to the plurality of additional configurable light fixtures;
wherein the computer controller configures and controls the operation of the plurality of additional light fixtures based on the information received by the computer controller about the object to be photographed and inspected by the station.

8. A method comprising:
receiving an object into a computer-controlled automated station, wherein the object received into the computer-controlled automated station is selected from the group consisting of jewelry, clothing, and industrial equipment; and
a computer controller functionally coupled to the automated station and performing the following steps:
receiving information about the object;
automatically adjusting one or more configuration options of the automated station based on the received information; and
receiving input about one or more operations to be performed by the automated station;
wherein the one or more operations includes: photographing the object, measuring a weight of the object, determining a refractive index of light from the object, or a combination.

9. The method of claim 8, wherein the step of receiving information about the object comprises receiving information about the type of object.

10. The method of claim 8, wherein the automated station includes one or more light fixtures, one or more cameras, and a turntable, and wherein the step of automatically adjusting the configuration options of the automated station comprises one or more of: adjusting lighting features, adjusting camera features, and adjusting turntable features.

11. The method of claim 10, further comprising:
positioning the object onto a tray with known dimensions; and
wherein the step of receiving the object into the automated station comprises placing the tray with the object positioned thereon onto the turntable within the automated station.

12. The method of claim 11, further comprising:
the computer controller:
automatically taking one or more photographs of the object on the tray; and
using the photographs to determine measurements of the object by comparison with the known dimensions of the tray.

13. The method of claim 12, wherein when the object is a jewelry item, the step of determining measurements of the object includes one or more of the following: determining a nominal size of the object, determining a thickness of the object, determining a height of the object, and determining a nominal length of the object.

14. The method of claim 8, wherein the automated station includes scales, and wherein the measuring step further comprises: weighing the object using the scales.

15. The method of claim 8, further comprising:
the computer controller:
operating one or more cameras within the automated station to measure a reflectivity of light coming off the object;
operating a refractometer within the automated station to measure a refractive index of light coming off the object; and
determining a characteristic of the object based on the measured reflectivity and the measured refractive index.

16. The method of claim 15, wherein when the object is a gemstone, the step of determining a characteristic of the object further comprises:
the computer controller:
comparing the measured refractive index of the gemstone to a database of known refractive indices for gemstones; and
determining the gemstone type.

17. The method of claim 15, wherein when the object is a gemstone, the step of determining a characteristic of the object further comprises:
the computer controller:
determining whether the gemstone is synthetic or real.

18. The station of claim 1, wherein the object to be photographed and inspected by the station is selected from the group consisting of jewelry, clothing, and industrial equipment.

* * * * *